(12) United States Patent
Bahra et al.

(10) Patent No.: US 6,226,780 B1
(45) Date of Patent: May 1, 2001

(54) CIRCUIT DESIGN METHOD AND APPARATUS SUPPORTING A PLURALITY OF HARDWARE DESIGN LANGUAGES

(75) Inventors: Avtar Singh Bahra, Newbury; Gordon Walker, Berks; Mark Dane; Mike J. Reynolds, both of Newbury, all of (GB)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 09/144,833

(22) Filed: Aug. 31, 1998

(51) Int. Cl.[7] .................................................. G06F 17/50
(52) U.S. Cl. .................................................. 716/18; 716/3
(58) Field of Search .............................. 716/1, 3, 11, 18; 706/919–921; 707/100–104

(56) References Cited

PUBLICATIONS

Martinolle et al., "A Procedural Language Interface for VHDL and its Typical Applications," Proc of NC/VIUF, pp. 32–38, 1998.*

Mathur et al., "HDL Generation From Parameterized Schematic Design System," IEEE, pp. 130–134, 1997.*

Sauge et al., "Integrating of Verilog–HDL and VHDL Languages in the SMASH™ Mixed–Signal Multilevel Simulator," Proc. IVC/VIUF, pp. 2–6, 1998.*

Ussery et al., "HDL and Integrating System–Level Simulation Technologies", IEEE, pp. 91–97, 1997.*

Verschueren, "Rule Base Driven Conversion of an Object Oriented Design Data Structure into Standard HDLs", Proc. 24th Euromicro Conf., pp. 42–45, 1998.*

* cited by examiner

Primary Examiner—Matthew Smith
Assistant Examiner—Leigh Marie Garbowski
(74) Attorney, Agent, or Firm—Columbia IP Law Group, LLC

(57) ABSTRACT

The present invention beneficially provides a method and apparatus that can support multiple HDLs in both the creation of new circuit designs and the use of legacy data such as IP blocks. Where a graphical design tool supports a first HDL and design data is provided in a second HDL, the present invention generates an interface description for the design data written in the first HDL, and then generates a graphical design unit based on the interface description. The resulting graphical design unit is supported by the graphical design tool.

21 Claims, 7 Drawing Sheets

FIG. 5

```
BLOCK2.V

500    MODULE LATCH (CLK, RESET, D, Q) ;
505        INPUT CLK, RESET; D ;
510        OUTPUT Q ;
515
520    ALWAYS @ ( CLK OR RESET OR D)   BEGIN
525        IF (RESET == 1)
530            Q <=0 ;
535        ELSE IF (CLK ==1)
540            Q <= D
545        END
550    END MODULE
```

FIG. 6

```
BLOCK2_ INTERFACE.VHDL

600    ENTITY LATCH IS
610        PORT (CLK, RESET, D: IN BIT;
620                Q: OUT BIT) ;
630    END ENTITY LATCH
```

CIRCUIT DESIGN METHOD AND APPARATUS SUPPORTING A PLURALITY OF HARDWARE DESIGN LANGUAGES

BACKGROUND OF THE INVENTION

1. Field of the Invention

The present invention pertains to the field of circuit design. More particularly, this invention relates to the art of circuit design supporting a plurality of hardware design languages.

2. Background

Integrated circuit design is often undertaken using one or the other of the two industry standard hardware design languages (HDL). Very high speed integrated circuit (VHSIC) hardware design language (VHDL) and Verilog are both IEEE standard HDLs and each has about equal market share with some geographical variances. VHDL and Verilog can be used to describe the structure and function of an integrated circuit design at numerous levels of abstraction. Both HDLs can be compiled into machine readable form allowing designs to be simulated and verified before being manufactured. Using VHDL and Verilog, designers can quickly compare alternative designs and test design criteria without the delay and expense of hardware prototyping.

Designing an integrated circuit using only an HDL can be incredibly difficult and time consuming because an HDL file is purely textual. Many designers feel more comfortable using graphical design tools. Graphical design tools often support either VHDL or Verilog, based on the assumption that a single HDL will be used throughout the downstream design flow. In which case, when HDL files are automatically generated to describe a graphical circuit design, the HDL files are usually provided in only one HDL format, either VHDL or Verilog. To provide the circuit design in both VHDL and Verilog, it may be necessary to use two graphical entry tools. Since graphical entry tools can be very expensive, design houses have historically invested in either a Verilog design flow or a VHDL design flow, but not both.

Supporting a single HDL may not pose a problem when a circuit design goes from conception to production within a single design house. As design complexity continues to increase however, new designs are frequently based on existing designs or legacy design data. A market has developed for legacy data, often called intellectual property (IP) blocks or "system-on-silicon" building blocks. For instance, existing microprocessor blocks or digital signal processor (DSP) cores, written in an HDL, may be purchased from an outside source and imported into a new design, potentially reducing the time to market for the new technology.

Unfortunately, an IP block may only be available in one HDL since design houses frequently only support one HDL. In which case, the advantage of using an IP block is virtually eliminated if the HDL in question is not supported. The problem is compounded as global circuit design becomes more common. For instance, even within a single business entity, a library of IP blocks may be generated in VHDL at one location where VHDL is prevalent. Then, the library may be provided in another location where Verilog is prevalent. Obviously, the utility and marketability of IP is limited by HDL compatibility between producer and consumer.

Thus, a need exists for an integrated circuit design method and apparatus that can support multiple HDLs in both the creation of new circuit designs and the use of legacy data such as IP blocks.

SUMMARY OF THE INVENTION

The present invention beneficially provides a method and apparatus that can support multiple HDLs in both the creation of new circuit designs and the use of legacy data such as IP blocks. Where a graphical design tool supports a first HDL and design data is provided in a second HDL, the present invention generates an interface description for the design data written in the first HDL, and then generates a graphical design unit based on the interface description. The resulting graphical design unit is supported by the graphical design tool.

BRIEF DESCRIPTION OF THE DRAWINGS

Examples of the present invention are illustrated in the accompanying drawings. The accompanying drawings, however, do not limit the scope of the present invention. Like references in the drawings indicate similar elements.

FIG. 5 illustrates one embodiment of a Verilog block.

FIG. 6 illustrates one embodiment of a VHDL interface.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Figure 1:
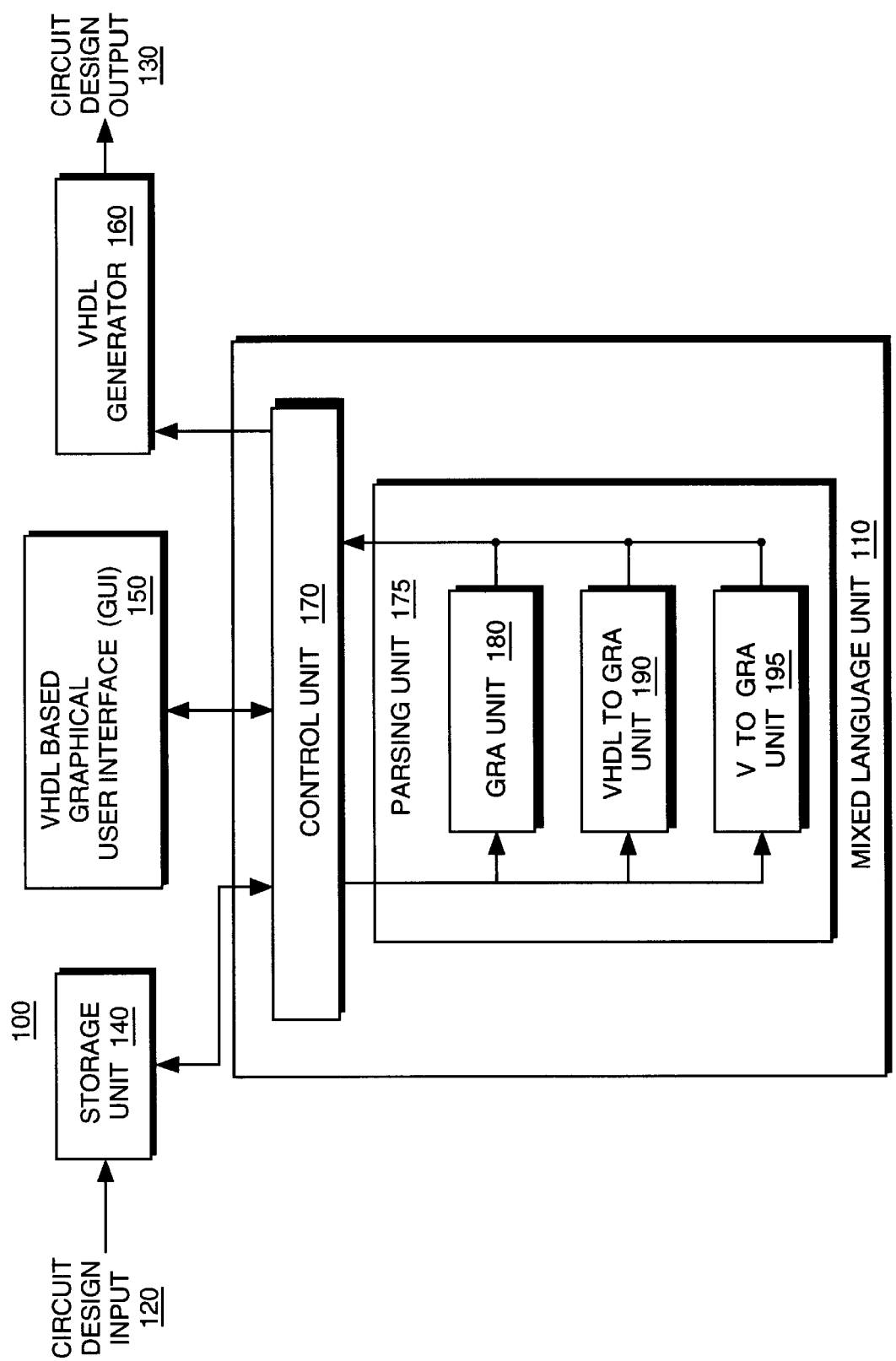
FIG. 1 illustrates a design system incorporating one embodiment of the present invention.

FIG. 1 illustrates one embodiment of the present invention, mixed language unit 110, as it is used in an integrated circuit design system 100. As discussed below, mixed language unit 110 enables design system 100 to receive data in a mixture of hardware description language (HDL) formats, create a new graphical circuit design using the mixed data, and generate an integrated HDL description of the new circuit design. Thus, mixed language unit 110 beneficially provides for the use of intellectual property (IP) blocks, written in one particular HDL format, in graphical circuit designs that are primarily based on another HDL format.

HDLs include, but are not limited to, Verilog and very high speed integrated circuit (VHSIC) hardware description language (VHDL). Direct translation from one HDL to another may not always be possible. For instance, VHDL includes features which are not available in Verilog, and vice versa. Therefore, rather than trying to translate one HDL to another, the present invention beneficially allows blocks provided in one or more HDLs to be instantiated and manipulated within a circuit design otherwise provided in a different HDL.

Design system 100 includes storage unit 140, graphical user interface (GUI) 150, VHDL generator 160, and mixed language unit 110. With the exception of mixed language unit 110, each element represents any of a number of such elements. Mixed language unit 110 includes control unit 170 and parsing unit 175. Parsing unit 175 includes GRA unit 180, VHDL_to_GRA unit 190, and V_to_GRA unit 195. Alternate embodiments may include additional elements, combine one or more elements, and/or re-arrange one or more elements.

Figure 2:
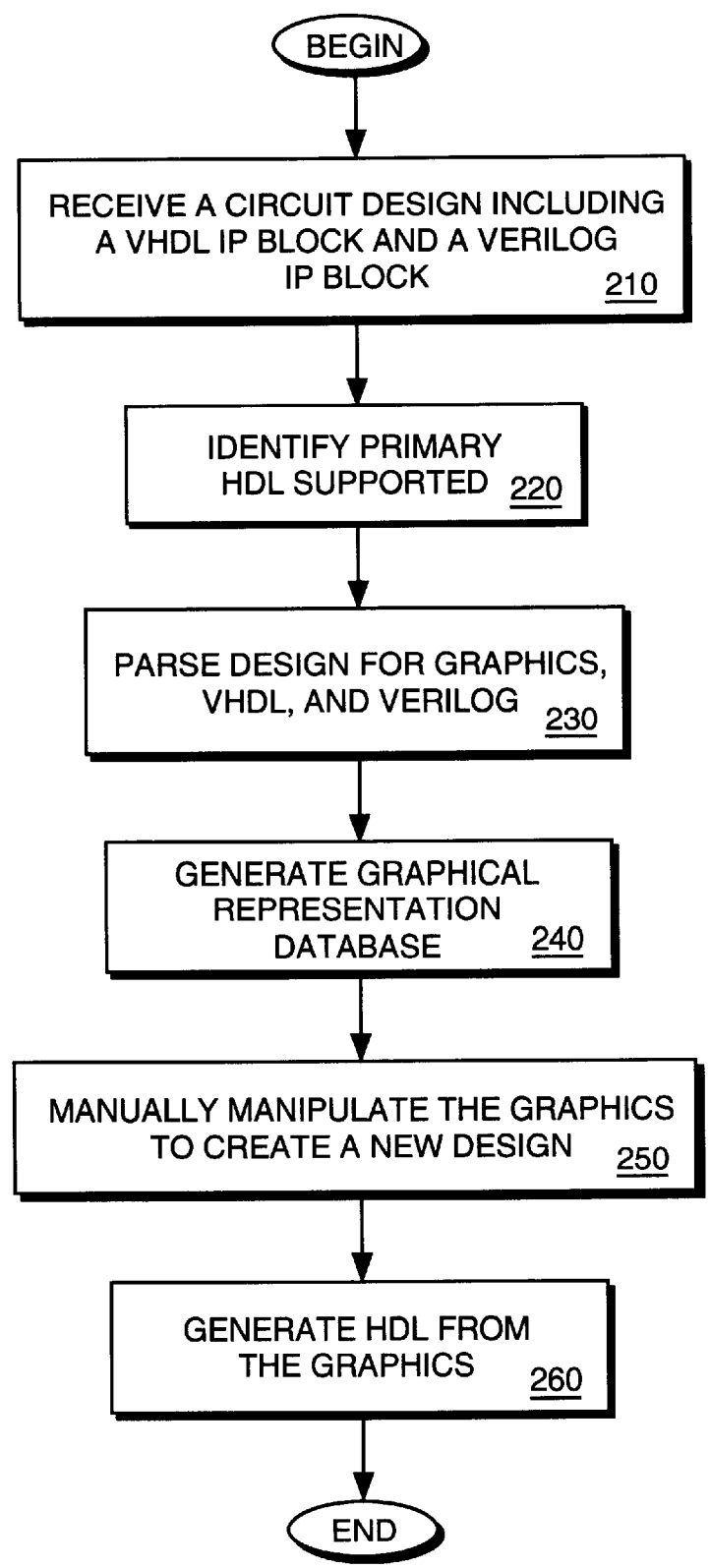
FIG. 2 demonstrates one embodiment of the present invention.

FIG. 2 illustrates one embodiment of the process as it is performed by design system 100 of FIG. 1. First, in step 210, circuit design input 120 is received. The design input includes an IP block written in VHDL and an IP block written in Verilog. Circuit design input 120 is stored in storage unit 140. As will be discussed below, circuit design input 120 can include data in addition to IP blocks, such as ASCII (American Standard Code for Information Interchange) files defining graphical representations of circuit elements.

Next, in step 220, control unit 170 identifies which HDL will be used as the primary HDL for a given circuit design. The primary HDL may be the same as the HDL supported by certain elements within the design system. In the illustrated embodiment, graphical user interface (GUI) 150 and generator 160 only support VHDL. Therefore, the primary HDL for design system 100 should always be VHDL. In which case, step 220 needs only to be performed once for design system 100. Where multiple HDLs are supported within a design system however, the primary HDL may be user specified for each new circuit design. For instance, GUI 150 may support both VHDL and Verilog, or control unit 170 may be coupled to two GUIs, one supporting VHDL and one supporting Verilog. In which case, corresponding HDL generator support may also be needed.

Figure 3:
FIG. 3 illustrates one embodiment of circuit design input.

In step 230, control unit 170 directs parsing unit 175 to parse circuit design input 120. That is, parsing unit 175 identifies parts of circuit design input 120 that are Verilog, VHDL, and ASCII graphics files. For example, FIG. 3 illustrates one embodiment of a directory, DESIGNA_IN, which may have been included in circuit design input 120 and stored in storage unit 140. The first five files in the directory include three ASCII graphics files indicated by the suffix GRA, one block of VHDL indicated by the suffix VHDL, and one Verilog block indicated by the suffix V. In alternate embodiments, any number of naming conventions or identification methods can be used to identify data formats.

Within parsing unit 175 the files are provided to GRA unit 180, VHDL_to_GRA unit 190, or V_to_GRA unit 195, and in step 240, graphical representations of the design input are provided to a database stored in storage unit 140.

GRA unit 180 identifies the ASCII graphics files based on the .GRA suffix. Then GRA unit 180 returns them to control unit 170 for addition to the database of ASCII graphics files stored in storage unit 140. In the illustrated example, PORT1.GRA, PORT2.GRA, and CIRCUIT1.GRA are added to the database.

VHDL_to_GRA unit 190 identifies the VHDL files and converts the VHDL files to one or more ASCII graphics files. Any number of conversion techniques can be used. An example of an HDL to graphics conversion is discussed in copending U.S. patent application Ser. No. (2282.P053) 09/XXX,XXX filed (August/September) XX, 1998, entitled "METHOD AND APPARATUS FOR GRAPHICALLY PRESENTING AN INTEGRATED CIRCUIT DESIGN," which is assigned to the corporate assignee of the present invention and is hereby incorporated by reference. The ASCII graphics files may include multiple graphical circuit representations organized in one or more levels of detail, wherein the highest level may be a graphical design unit representing an entire block of VHDL.

Figure 4:
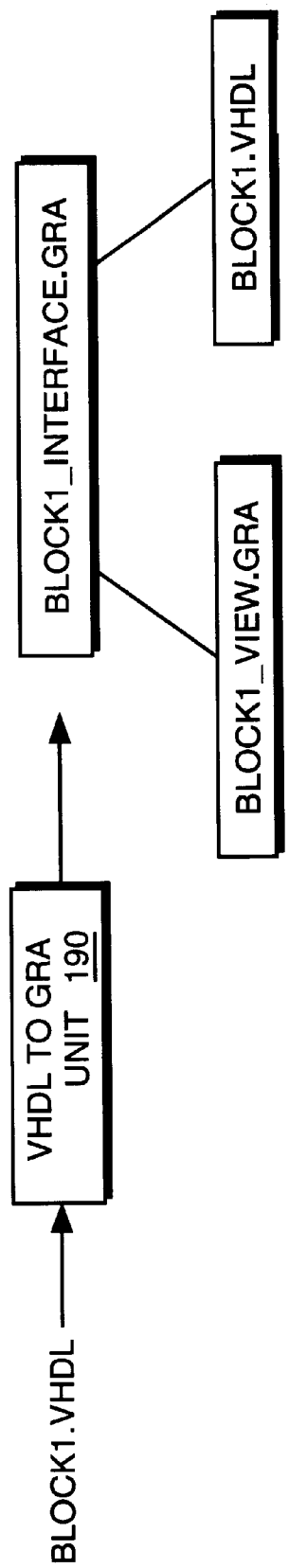
FIG. 4 illustrates an example of a VHDL to graphics conversion.

An example is illustrated in FIG. 4. VHDL_to_GRA unit 190 receives BLOCK1.VHDL. At the output, a graphical design unit, BLOCK1_INTERFACE.GRA, represents the entire VHDL block. The graphical design unit references the VHDL block and references one or more additional levels of graphical representation in BLOCK1_VIEW.GRA. Both the VHDL block and the referenced graphical representation are called views. A view defines the function of a graphical design unit.

V_to_GRA unit 195 identifies the Verilog files. As discussed above however, Verilog is not 100% translatable into VHDL. As a result, an ASCII graphics representation based on a Verilog description may not be readable by a GUI that only supports VHDL. Similarly, an HDL generator which only supports VHDL may not be able to generate a VHDL description of a circuit design including ASCII graphics representations that are based on Verilog. Furthermore, even if a GUI does support VHDL and Verilog based ASCII graphics representations, and even if a HDL generator does support conversions from ASCII graphics representations to VHDL and Verilog, the generated HDL description may still include both VHDL and Verilog because certain Verilog based ASCII graphics representations cannot be described in VHDL and vice versa.

Thus, V_to_GRA unit 195 does not bother trying to convert Verilog files to VHDL compatible ASCII graphics representations. Instead, V_to_GRA unit 195 writes an interface description for the each Verilog file in VHDL and then generates ASCII graphics representations based on the VHDL interface descriptions.

In order to generate a VHDL interface description, the structure of the interface must first be identified in the Verilog file. Virtually any interface structure that can be realized in Verilog can also be realized in VHDL and vice versa. An interface merely provides ports for all of the inputs and outputs on a block.

FIG. 5 illustrates an example of a Verilog block BLOCK2.V. Since Verilog and VHDL are IEEE standards, certain keys words can be used to identify structures. On line 500, the word "module" indicates the beginning of a structure, and by convention the next word on the line is the name of the structure. Following the name of the structure, the ports are named and in the next lines, the port types are defined. In the illustrated embodiment, the interface is named "latch" and it has input ports clk, reset, and d, and output port q. Various alternate techniques can be used to identify the interface structure.

Figure 7:
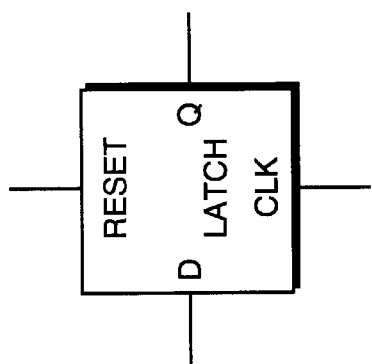
FIG. 7 illustrates an example of a graphical representation of a VHDL interface.

FIG. 6 illustrates the corresponding VHDL interface BLOCK2_INTERFACE.VHDL. The name of the structure is "latch" and it includes input ports clk, reset, and d, and output port q. Using an HDL to graphics conversion like that used in VHDL to GRA unit 190, an ASCII graphics representation can be generated and provided to the database in storage unit 140. FIG. 7 illustrates an example of the ASCII graphics representation as displayed in GUI 150.

Figure 8:
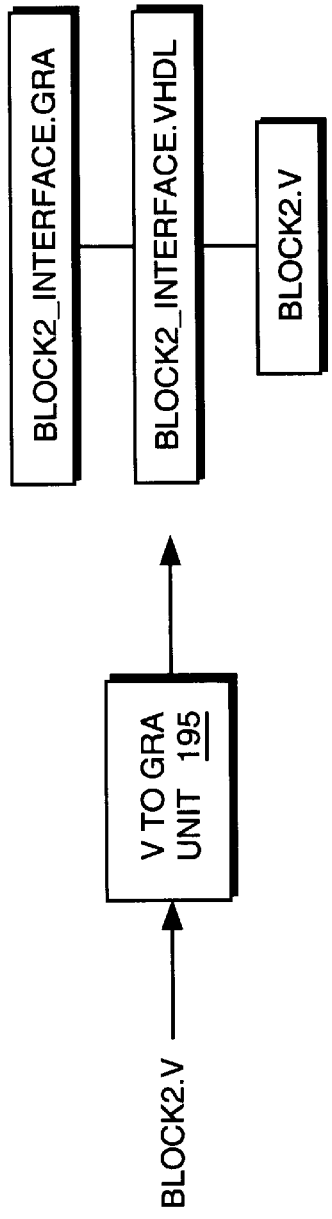
FIG. 8 illustrates an example of a Verilog to graphics conversion.

FIG. 8 illustrates an example of V_to_GRA unit 195. At the input, V_to_GRA unit 195 receives BLOCK2.V which is a Verilog block. At the output, a VHDL interface description, BLOCK2_INTERFACE.VHDL, is provided which references BLOCK2.V as a view. From the VHDL interface description, BLOCK2_INTERFACE.GRA is generated which in turn references the VHDL interface as a view.

Returning to FIG. 2, once circuit design input 120 is represented in ASCII files and stored in a database in storage unit 140, control unit 170 can provide the database to GUI 150 where, in step 250, the circuit design can be manually manipulated. GUI 150 reads the ASCII files in the database and displays corresponding images. A user may just want to generate a graphical representation of an exiting block of HDL, or a designer may wish to create a new graphical circuit design. Graphical elements can be removed, re-arranged, and added to the circuit design. Entire blocks of VHDL and Verilog based blocks may be instantiated in the new circuit design. A designer can also manipulate the internal functions of IP blocks by dropping down into a view and making changes, corrections, etc.

A block is usually only instantiated based on one view version. For instance, as shown in FIG. 4, for a VHDL based block, a designer can drop down into the graphical representation provided by BLOCK1_VIEW.GRA and make changes there if BLOCK1_INTERFACE.GRA was instantiated based on the graphical view. Alternately, if the block were instantiated using the VHDL view, the designer could drop down into the VHDL text files and make changes there. A block can usually only be instantiated using one view because a view defines the function of block, and if one view is edited and not another, errors could occur.

A Verilog based block, however, only has one view in the VHDL based GUI 150, and that one view references another view. As shown in FIG. 8, BLOCK2_INTERFACE.GRA references BLOCK2_INTERFACE.VHDL which in turn references the Verilog file BLOCK2.V. In order to reach the Verilog text, a designer may have to drop down two levels of views. Alternately, control unit 170 may automatically provide the Verilog block and bypass the VHDL interface block when a designer wishes to call up a view from the database.

Figure 9:
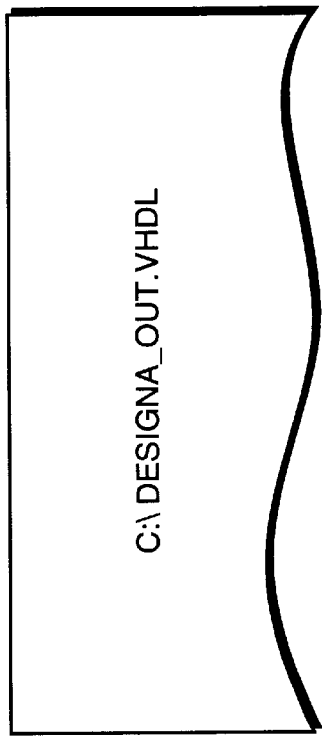
FIG. 9 illustrates one embodiment of circuit design output.

In step 260 of FIG. 2, an HDL description of the newly created or modified circuit design can be generated by VHDL generator 160 based on the graphical representation. Any number of methods can be used. The result is a high level VHDL file which references lower level files, such as the Verilog file BLOCK2.V, including any modifications which may have been made in the previous step. FIG. 9 illustrates one embodiment of an output VHDL file generated by generator 160.

In the illustrated embodiment, design system 100 primarily supports very high speed integrated circuit (VHSIC) hardware description language (VHDL). That is, graphical user interface (GUI) 150 and generator 160 both support VHDL. Those skilled in the art will recognize that the present invention can similarly be applied to a design system that primarily supports Verilog, or any number of additional HDLs, and that sufficient detail is presented to enable additional embodiments which support any number of HDLs.

Figure 10:
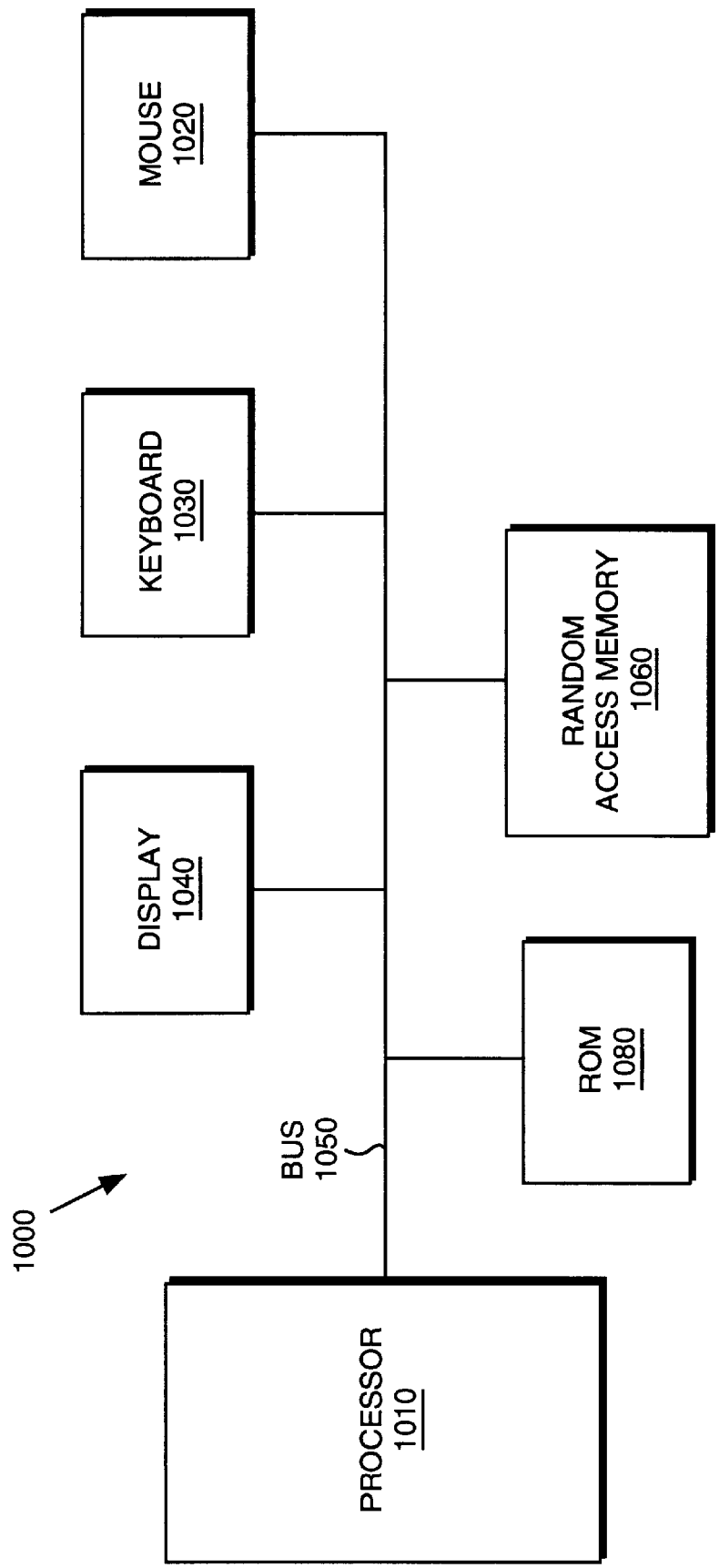
FIG. 10 illustrates a computer system incorporating the teachings of the present invention.

FIG. 10 represents a broad category of computer systems including, but not limited to, those based on the Pentium® processor, Pentium Pro processor, and Pentium® II processor manufactured by and commonly available from Intel Corporation of Santa Clara, Calif., or the Alpha® processor manufactured by Digital Equipment Corporation of Maynard, Mass. In FIG. 10, processor 1010 includes one or more microprocessors. Processor 1010 is coupled to random access memory (RAM) 1060 and read only memory (ROM) 1080 by bus 1050. Input/Output devices, including display device 1040, keyboard 1030, and mouse 1020, are also coupled to bus 1050. In certain embodiments, one or more components may be eliminated, combined, or rearranged. A number of additional components may also be coupled to bus 1050 including, but not limited to, a bus bridge to another bus, one or more disk drives, an internet interface, additional audio/video interfaces, additional memory units, and additional processor units.

Figure 11:
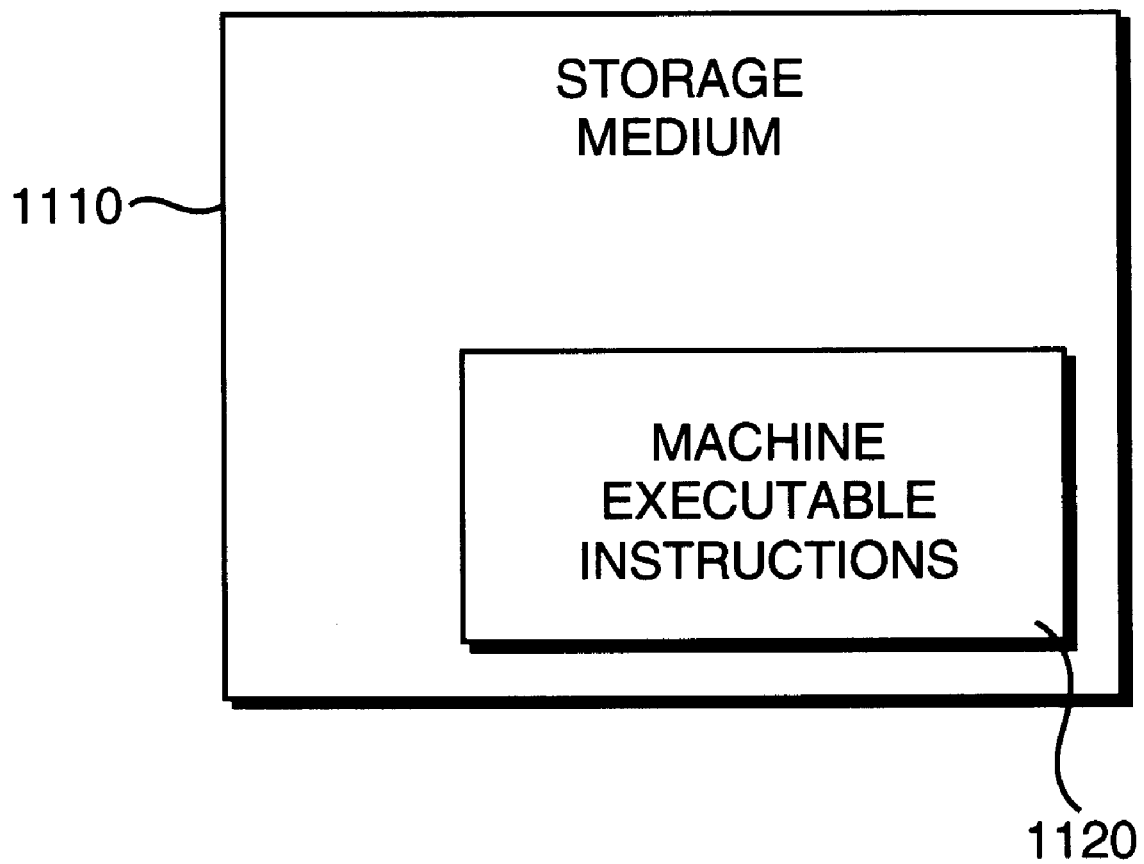
FIG. 11 illustrates a storage medium containing instructions to implement the present invention.

Design system 100 and/or mixed language unit 110, as shown in FIG. 1, can be executed by processor 1010 as a series or sequence of instructions or function calls stored, for instance, in ROM 1080 or RAM 1060. Alternately, as shown in FIG. 11, machine executable instructions 1120 representing design system 100 and/or mixed language unit 110 could be stored on distribution storage medium 1110, such as a CD ROM, a digital video or versatile disk (DVD), or a magnetic storage medium like a floppy disk or tape. The instructions could also be downloaded from a local or remote server.

Alternately, one or more ASICs (application specific integrated circuits) could be endowed with some or all of the functionality of design system 100 and/or mixed language unit 110, and inserted into system 1000 as separate components, or combined with one or more other components.

Thus, an improved circuit design method and apparatus supporting multiple HDLs is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:
   generating an interface description written in a first hardware description language (HDL) based on a text file written in any one of a plurality of second HDLs; and
   generating a graphical design unit based on the interface description, said graphical design unit for use in a graphical circuit design environment which supports the first HDL.

2. The method of claim 1 further comprising:
   manipulating the graphical design unit in the graphical circuit design environment to create a graphical circuit design;
   generating a textual description of the graphical circuit design based at least in part on the manipulated graphical design unit, said textual description being written in the first HDL, wherein the textual description references the text file written in the second HDL.

3. The method of claim 1 wherein the generating the interface description comprises:
   receiving circuit design input, said circuit design input including the text file written in the second HDL;
   identifying the first HDL;
   parsing the circuit design input to identify the text file written in the second HDL;
   scanning the text file written in the second HDL for interface elements; and translating the interface elements into interface elements written in the first HDL.

4. The method of claim 3 wherein the identifying the first HDL includes one of querying the circuit design environment for a supported HDL and querying for a user preference.

5. The method of claim 3 wherein the scanning comprises:
analyzing the text file written in the second HDL for key words indicative of interface elements;
identifying structural elements comprising the interface elements; and
writing equivalent structural elements in the first HDL.

6. The method of claim 1 wherein the plurality of second HDLs comprises Verilog and very high speed integrated circuit (VHSIC) hardware description language (VHDL).

7. The method of claim 1 wherein the generating a graphical design unit comprises:
providing a graphical interface including input ports and output ports as defined in the text file written in the second HDL.

8. A machine readable storage medium having stored thereon machine executable instructions, the execution of said machine executable instructions to implement a method comprising:
generating an interface description written in a first hardware description language (HDL) based on a text file written in any one of a plurality of second HDLs; and
generating a graphical design unit based on the interface description, said graphical design unit for use in a graphical circuit design environment which supports the first HDL.

9. The machine readable storage medium of claim 8, the method further comprising:
manipulating the graphical design unit in the graphical circuit design environment to create a graphical circuit design;
generating a textual description of the graphical circuit design based at least in part on the manipulated graphical design unit, said textual description being written in the first HDL, wherein the textual description references the text file written in the second HDL.

10. The machine readable storage medium of claim 8, wherein the generating the interface description comprises:
receiving circuit design input, said circuit design input including the text file written in the second HDL;
identifying the first HDL;
parsing the circuit design input to identify the text file written in the second HDL;
scanning the text file written in the second HDL for interface elements; and
translating the interface elements into interface elements written in the first HDL.

11. The machine readable storage medium of claim 10, wherein the identifying the first HDL includes one of querying the circuit design environment for a supported HDL and querying for a user preference.

12. The machine readable storage medium of claim 10, wherein the scanning comprises:
analyzing the text file written in the second HDL for key words indicative of interface elements;
identifying structural elements comprising the interface elements; and
writing equivalent structural elements in the first HDL.

13. The machine readable storage medium of claim 8, wherein the plurality of second HDLs comprises Verilog and very high speed integrated circuit (VHSIC) hardware description language (VHDL).

14. The machine readable storage medium of claim 8, wherein the generating a graphical design unit comprises:
providing a graphical interface including input ports and output ports as defined in the text file written in the second HDL.

15. An apparatus comprising:
a mixed language unit to generate an interface description written in a first hardware description language (HDL) based on a text file written in any one of a plurality of second HDLs, and generate a graphical design unit based on the interface description, said graphical design unit for use in a graphical circuit design environment which supports the first HDL.

16. The apparatus of claim 15, wherein the mixed language unit includes:
a first port to provide the graphical design unit to the graphical circuit design environment to manipulate the graphical design unit to create a graphical circuit design; and
a second port to provide the graphical circuit design to an HDL generator to generate a textual description of the graphical circuit design based at least in part on the manipulated graphical design unit, said textual description being written in the first HDL, wherein the textual description references the text file written in the second HDL.

17. The apparatus of claim 15 wherein the mixed language unit comprises:
a control unit to receive circuit design input and identify the first HDL, said circuit design input including the text file written in the second HDL; and
a parsing unit to parse the circuit design input to identify the text file written in the second HDL, said parsing unit including an HDL-to-graphics unit to scan the text file written in the second HDL for interface elements, and translate the interface elements into interface elements written in the first HDL.

18. The apparatus of claim 17 wherein the control unit identifies the first HDL by one of querying the circuit design environment for a supported HDL and querying for a user preference.

19. The apparatus of claim 17 wherein, when the HDL-to-graphics unit scans the text file written in the second HDL for interface elements, the HDL-to-graphics unit is to analyze the text file written in the second HDL for key words indicative of interface elements, identify structural elements comprising the interface elements, and write equivalent structural elements in the first HDL.

20. The apparatus of claim 15 wherein the plurality of second HDLs comprises Verilog and very high speed integrated circuit (VHSIC) hardware description language (VHDL).

21. The apparatus of claim 15 wherein the graphical design unit comprises a graphical interface including input ports and output ports as defined in the text file written in the second HDL.

* * * * *

UNITED STATES PATENT AND TRADEMARK OFFICE
CERTIFICATE OF CORRECTION

PATENT NO.    : 6,226,780 B1
DATED         : May 1, 2001
INVENTOR(S)   : Bahra et al.

It is certified that error appears in the above-identified patent and that said Letters Patent is hereby corrected as shown below:

Column 3,
Line 51, "suffix GRA, one" should read -- suffix .GRA, one --.
Line 52, "VHDL, and" should read -- .VHDL, and -- .
Line 52, "by the suffix V." should read -- by the suffix .V. --.

Column 4,
Lines 3-4, "(2282.P053) 09/XXX,XXX filed (August/September) XX, 1998, entitled "METHOD AND APPARATUS FOR GRAPHICALLY PRESENTING AN INTEGRATED CIRCUIT DESIGN,"" should read -- 09/140,632 filed August 26, 1998, entitled "METHOD AND APPARATUS FOR GRAPHICALLY PRESENTING AN INTEGRATED CIRCUIT DESIGN," --.

Column 5,
Line 66, "Pentium Pro processor," should read -- Pentium® Pro processor, --.

Signed and Sealed this

Nineteenth Day of March, 2002

Attest:

Attesting Officer

JAMES E. ROGAN
Director of the United States Patent and Trademark Office